US009846991B2

(12) United States Patent
Himmelright et al.

(10) Patent No.: US 9,846,991 B2
(45) Date of Patent: Dec. 19, 2017

(54) GAMING SYSTEM

(71) Applicant: Aristocrat Technologies Australia Pty Limited, North Ryde, NSW (AU)

(72) Inventors: Jeff Himmelright, Las Vegas, NV (US); David Lawdensky, Pahrump, NV (US); Gary Frerking, Henderson, NV (US); Jeffrey Topham, Las Vegas, NV (US); David Salour, Las Vegas, NV (US)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 0 days.

(21) Appl. No.: 15/339,461

(22) Filed: Oct. 31, 2016

(65) Prior Publication Data

US 2017/0046916 A1 Feb. 16, 2017

Related U.S. Application Data

(63) Continuation of application No. 12/192,673, filed on Aug. 15, 2008, now Pat. No. 9,483,907.

(Continued)

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ...... *G07F 17/3239* (2013.01); *G07F 17/3209* (2013.01); *G07F 17/3211* (2013.01); *G07F 17/3227* (2013.01); *G07F 17/3234* (2013.01); *G07F 17/3244* (2013.01); *G07F 17/3246* (2013.01); *G07F 17/3251* (2013.01)

(58) Field of Classification Search

CPC ............. G07F 17/3239; G07F 17/3209; G07F 17/3211; G07F 17/3227; G07F 17/3234; G07F 17/3244; G07F 17/3246; G07F 17/3251

USPC .................................. 463/16, 20, 25, 29, 42

See application file for complete search history.

(56) References Cited

U.S. PATENT DOCUMENTS 5,611,730 A 3/1997 Weiss
5,655,961 A 8/1997 Acres et al.

(Continued)

FOREIGN PATENT DOCUMENTS

CN 1444038 A 9/2003
EP 1139310 A2 10/2001

(Continued)

*Primary Examiner* — Omkar Deodhar
*Assistant Examiner* — Wei Lee
(74) *Attorney, Agent, or Firm* — McAndrews, Held & Malloy, Ltd.

(57) ABSTRACT

A gaming machine is disclosed which comprises at least one meter arranged to generate game meter data. The gaming machine is arranged to forward meter data generated by the at least one meter to a remote data storage device arranged to store meter data associated with a plurality of games. The gaming machine is also arranged to retrieve meter data associated with a game from the remote data storage device when the gaming machine is requested to provide the meter data associated with the game. An associated gaming system and method of gaming are also disclosed.

12 Claims, 5 Drawing Sheets

Related U.S. Application Data

(60) Provisional application No. 60/956,482, filed on Aug. 17, 2007.

(56) References Cited

U.S. PATENT DOCUMENTS

| | | | | |
|---|---|---|---|---|
| 6,319,125 | B1 | 11/2001 | Acres | |
| 6,939,234 | B2 | 9/2005 | Beatty | |
| 7,766,745 | B1 * | 8/2010 | Green | G07F 17/3223 463/16 |
| 2002/0154749 | A1 | 10/2002 | Conn et al. | |
| 2003/0228904 | A1 | 12/2003 | Acres et al. | |
| 2004/0087360 | A1 | 5/2004 | Chamberlain et al. | |
| 2005/0153764 | A1 | 7/2005 | Sterchi et al. | |
| 2006/0046820 | A1 | 3/2006 | Inamura | |
| 2006/0160621 | A1 | 7/2006 | Rowe et al. | |
| 2006/0160626 | A1 | 7/2006 | Gatto | |
| 2007/0032295 | A1 | 2/2007 | Muir et al. | |

FOREIGN PATENT DOCUMENTS

| | | | |
|---|---|---|---|
| FR | 2622302 | A1 | 4/1989 |
| GB | 1164359 | A | 9/1969 |
| GB | 1278980 | A | 6/1972 |
| GB | 1284764 | A | 8/1972 |
| JP | 54087253 | A | 7/1979 |
| JP | 3208016 | A | 9/1991 |
| JP | 2001232062 | A | 8/2001 |
| JP | 2003044003 | A | 2/2003 |
| JP | 2003093600 | A | 4/2003 |
| JP | 2004062368 | A | 2/2004 |
| JP | 2004181010 | A | 7/2004 |
| JP | 2004290311 | A | 10/2004 |
| JP | 2004290364 | A | 10/2004 |
| JP | 2004290383 | A | 10/2004 |
| JP | 2006006494 | A | 1/2006 |
| JP | 2006149422 | A | 6/2006 |
| JP | 2006254942 | A | 9/2006 |
| JP | 2006271658 | A | 10/2006 |
| KR | 20010085489 | A | 9/2001 |
| RU | 2227275 | C2 | 4/2004 |
| WO | 2005028046 | A3 | 3/2005 |
| WO | 2006078433 | A1 | 7/2006 |

* cited by examiner

GAMING SYSTEM

RELATED APPLICATIONS

This application is a continuation of U.S. application Ser. No. 12/192,673, filed Aug. 15, 2008, which claims priority from U.S. Provisional Patent Application Ser. No. 60/956,482, filed on Aug. 17, 2007. The above-identified applications are hereby incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system and, in particular, to a metering system for a gaming system and a method of handling meter data.

It is known to provide a gaming machine which comprises a game controller arranged to randomly display several symbols from a predetermined set of symbols and to determine a game outcome such as a game win based on the displayed symbols. Such gaming machines may commonly be implemented as a stepper machine provided with reels with each reel carrying several symbols of the set, or a video machine wherein selected symbols are displayed on virtual reels on a graphical display device. Win outcomes can occur based on symbols appearing in one or more horizontal lines nominated by a player, or in any other predetermined way.

In at least some jurisdictions, it is a regulatory requirement that meter data is retained, such meter data including accounting data indicative of the amount of credits input into a gaming machine, the amount of credits dispensed by the gaming machine and the amount of credits available for game play, and game play data indicative of game play actions and outcomes for one or more previously played games. The purpose of the meter data is to resolve any player disputes, to ensure that an accurate record of gaming machine revenue is recorded for tax purposes, and to provide a mechanism for game operators to monitor the performance of a game.

The meter data is stored in the gaming machine until requested by a game accounting system, and when this occurs the accounting data is retrieved from the gaming machine so as to enable a game operator to reconcile the actual credits received by the gaming machine with the metered credit amount.

A similar system is provided for gaming machines arranged to selectively implement several dedicated games, i.e. multi-game gaming machines. With this arrangement, the gaming machine is capable of storing meter data relating to all games, and separate meter data relating to each game. Operation with game accounting systems is essentially the same as with a dedicated single gaming machine in that when the gaming machine is requested by a game accounting system to provide meter data the meter data stored at the gaming machine for one or more of the games is supplied to the accounting system.

However, current game accounting systems are relatively unsophisticated, and for gaming machines which are capable of downloading and implementing any one of a potentially large number of games stored on a remote server, it may not be possible with existing gaming machine architectures to save meter data for an indefinite number of games in existing configured meter(s). As a consequence, it is not possible to store or supply a game accounting system with metered data for each separate game on a non-dedicated gaming machine.

Current generation, single game slot machines, because of meter restrictions and the regulatory requirements with respect to metering, may only be able to receive a new downloaded game once each day since the game change results in a RAM clear (meter resets to “0”). It would be advantageous to be able to meter such games such that multiple downloads could occur whilst maintaining metering requirements.

For gaming terminals which can retain and locally meter a set of downloaded games, e.g. 10 games, it would be advantageous to meet metering requirements even though the set may be changed. It would also be advantageous to store meter data at a remote location to provide a back-up for purposes including archival and security as well as provide for business intelligence and remote access to meter data such as by, for example, regulators and manufacturers.

BRIEF SUMMARY OF THE INVENTION

In accordance with a first aspect of the present invention, there is provided a gaming machine comprising:

at least one meter arranged to generate game meter data;

the gaming machine being arranged to forward meter data generated by the at least one meter to a remote data storage device arranged to store meter data associated with a plurality of games; and the gaming machine being arranged to retrieve meter data associated with a game from the remote data storage device when the gaming machine is requested to provide the meter data associated with the game.

The gaming machine may further comprise a local meter data storage device arranged to store meter data created by the at least one meter.

In one embodiment, the gaming machine is arranged to forward meter data stored in the meter data storage device to a remote data storage device periodically.

In an alternative embodiment, the gaming machine is configured so as to be capable of receiving and implementing a downloadable game, and the gaming machine is arranged to forward meter data stored in the meter data storage device to a remote data storage device immediately prior to implementing a downloaded game.

In a further alternative embodiment, the gaming machine is arranged to forward meter data generated by the at least one meter to a remote data storage device as the meter data is created.

In a further embodiment the gaming machine is configured to forward meter data to a remote storage device in advance of “zeroing” the meter RAM.

In one arrangement, the gaming machine is arranged to retrieve meter data associated with a game from the remote data storage device when an accounting system is connected to the gaming machine.

In one embodiment, the at least one meter is arranged to generate meter data including accounting data indicative of credits received in the gaming machine, credits dispensed by the gaming machine and credits available for game play, and game play data indicative of game actions and outcomes for at least one previously played game.

In accordance with a second aspect of the present invention, there is provided a gaming system comprising:

at least one gaming machine comprising at least one game meter for generating meter data;

a remote data storage device arranged to store meter data associated with a plurality of games; and a communications link arranged to facilitate transfer of meter data between the at least one gaming machine and the remote data storage device;

wherein the system is arranged so as to transfer meter data associated with a game from the remote data storage device to the gaming machine when the gaming machine is requested to provide the meter data associated with the game.

The gaming system may further comprise a game repository including game data associated with a plurality of games, the game data being selectively downloadable and implementable as a game by the at least one gaming machine. For this purpose, the gaming system may further comprise a download server arranged to download game data associated with a game from the game repository to a gaming machine when requested by the gaming machine.

The remote data storage device may be arranged to store a plurality of meter records, each meter record being associated with a gaming machine and each meter record including information indicative of meter data associated with the or each game downloaded and implemented by the gaming machine. Each meter record may comprise a plurality of game records, each game record including meter data indicative of a game downloaded and implemented by the gaming machine.

The gaming system may further be arranged so as to facilitate access to the meter data stored in the remote data storage device by a user. In one arrangement, the gaming system further comprises an access server arranged to retrieve meter data from the remote data storage device, for example under control of a computing device. Remote access may be provided to enable regulators to confirm data, to enable a casino to use the data for business intelligence (e.g. determine specific performance profiles or determine particular player activities such as coin-in, wagers and awards or determine historical performance of a machine).

In accordance with a third aspect of the present invention, there is provided a method of managing meter data, said method comprising:

providing at least one gaming machine;

generating meter data at the gaming machine;

forwarding meter data generated at the gaming machine through a communications link to a remote data storage device arranged to store meter data associated with a plurality of games; and transferring meter data associated with a game from the remote data storage device to the gaming machine when the gaming machine is requested to provide the meter data associated with the game.

In accordance with a fourth aspect of the present invention, there is provided a system including at least one gaming machine, each gaming machine having at least one meter associated therewith to generate game meter data in connection with the play of a game, the system comprising:

a communication network;

a data storage and retrieval device; and a processing device configured to transmit meter data to said data storage and retrieval device arranged to store said game meter data and to retrieve meter data associated with a game from the remote data storage device when the gaming machine is requested to provide the meter data associated with the game.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
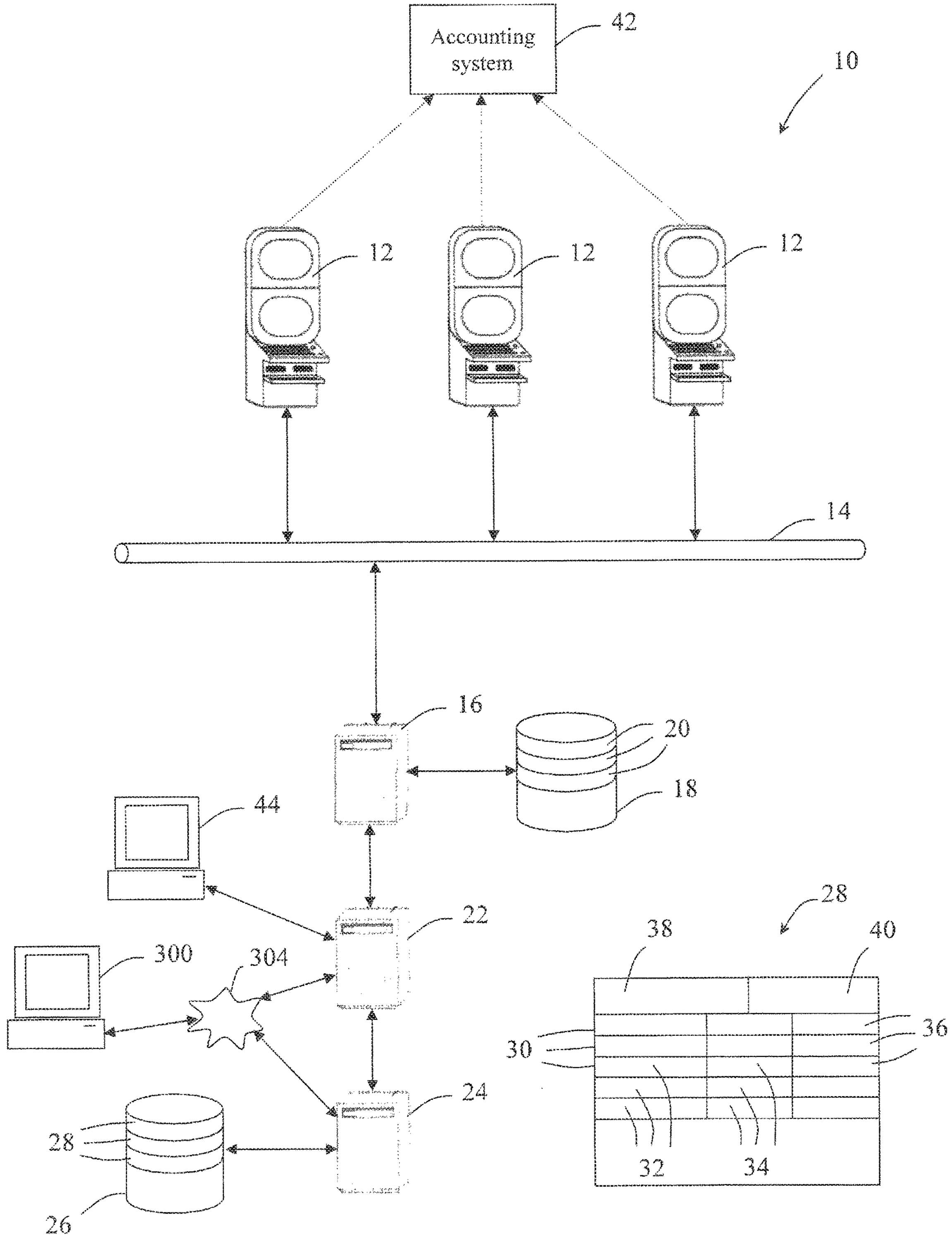
FIG. 1 is a schematic block diagram of a gaming system in accordance with an embodiment of the present invention.

Referring to the drawings, a gaming system 10 is shown which comprises at least one gaming machine 12 connected through a gaming network 14 to a download server 16 having an associated game repository 18.

The game repository 18 is arranged to store game data 20 for a plurality of downloadable games, each game being servable to a gaming machine 12 by the download server 16 when requested by the gaming machine 12. Each gaming machine 12 is configured so as to be capable of implementing any one of a plurality of games, in particular each gaming machine 12 is configured such that the gaming machine 12 is able to issue a request to the download server 16 for a game and is capable of receiving and implementing a game received from the download server 16.

Downloadable games may be downloaded individually or in sets, e.g. ten games. Games may be sent to the gaming machines 12 by the operator (referred to herein as "pushing" games to the gaming machine 12) or may be requested by a player at a gaming machine 12 (referred to herein as "pulling" games).

The gaming system 10 also includes a middle tier server 22, a database server 24 and a meter database 26 associated with the database server 24. Meter database 26 and server 24 may be located at, for example, a designated location in a casino but remote from the casino gaming machine floor or may be located at a location geographically remote from the casino. For example, the gaming machines 12 may be located at several geographically remote casinos. Each casino includes a network 14. Each casino may include their own meter database 26 and server 24. All gaming machines 12 for all casinos, the middle tier server 22 and/or database server 24 may also be in communication through a wide area network 304 (e.g. worldwide web) with an enterprise terminal 300 located in several of the casinos or at a remote location. In this fashion all meter data from the gaming machines 12 across an entire enterprise of several casinos may be accessed by the enterprise terminal 300 or a remote client enterprise terminal such as one located at a regulatory authority.

Each gaming machine 12 is arranged to forward meter data through the gaming network 14 to the database server 24 for storage in an appropriate meter record 28. This may occur at any suitable time, for example periodically such as every five minutes, as the meter data is generated, or immediately prior to downloading a new game to be implemented on the gaming machine 12. In embodiments wherein meter data is periodically forwarded to the remote database server 24 or forwarded to the remote database server 24 immediately prior to changing the game implemented by the gaming machine 12, a meter data memory 29 would also be provided at the gaming machine 12 and used to store meter data as the meter data is created during use.

In this example, the meter data includes accounting data indicative of credits received by a gaming machine 12, credits dispensed by the gaming machine 12 and credits available for game play in the gaming machine; and game play data indicative of game actions and outcomes for at least one, for example 10, previously played games. Meter data may include other information such as data to tie such information to a machine (e.g. machine number), the game played and a date and a time the meter information was generated.

The database server 24 is arranged to receive meter data from the or each gaming machine 12 present in the gaming system 10 and to store the meter data in a meter record 28 associated with the gaming machine 12 in the meter database 26.

In this example, each meter record 28 is associated with one gaming machine 12 and includes a plurality of game records 30. Each game record 30 includes a game identifier 32 indicative of the game, game play data 34 associated with play of the game and accounting data 36 associated with play of the game. Each meter record 28 also includes combined meter data 38 including game play data 34 associated with all games played on the gaming machine 12, and accounting data 40 associated with all games played on the gaming machine 12.

Each gaming machine 12 is also arranged to communicate with a game accounting system 42, in this example by direct connection of the accounting system 42 to a gaming machine 12. However, it will be understood that other arrangements are possible. For example, each gaming machine 12 may be arranged to communicate with the accounting system 42 through the gaming network 14 or in any other way.

Each gaming machine 12 is also configured so as to supply the accounting system 42 with meter data associated with the gaming machine 12 when the gaming machine 12 is requested to do so by the accounting system 42. When the gaming machine 12 receives such a request, the gaming machine 12 communicates with the database server 24 through the gaming network 14 and downloads the relevant meter record 28 associated with the gaming machine 12 or the relevant game record 30 from the relevant meter record 28. The gaming machine then supplies the meter data 34, 36 from the relevant game record 30 to the accounting system 42.

In this example, the gaming system 10 is also arranged so as to facilitate access to the meter records 28 by a user such as a gaming system operator, in this example by connecting a computing device 44 to the middle tier server 22 which serves as an access server, and configuring the middle tier server 22 so that under control of the computing device 44 the middle tier server 22 is able to extract meter data from the meter database 26 and provide the extracted meter data to the computing device 44.

In the present embodiment, each gaming machine 12 is arranged to implement a probabilistic game of the type wherein several symbols from a set of symbols are randomly displayed in a plurality of reels, and a game outcome is determined on the basis of the displayed symbols. Each reel is associated with a predetermined subset of symbols which are selectable for display.

With some such probabilistic games, the set of symbols include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display in the same line, scattered, and so on. The function associated with a function symbol may be for example a wild function wherein display of the function symbol is treated during consideration of the game outcome as any of the standard symbols. A function symbol may be represented as the word “WILD”, a star, or by any other suitable word or symbol. Other functions are also envisaged such as scatter functions, multiplier functions, repeat win functions, jackpot functions and feature commencement functions.

Figure 2:
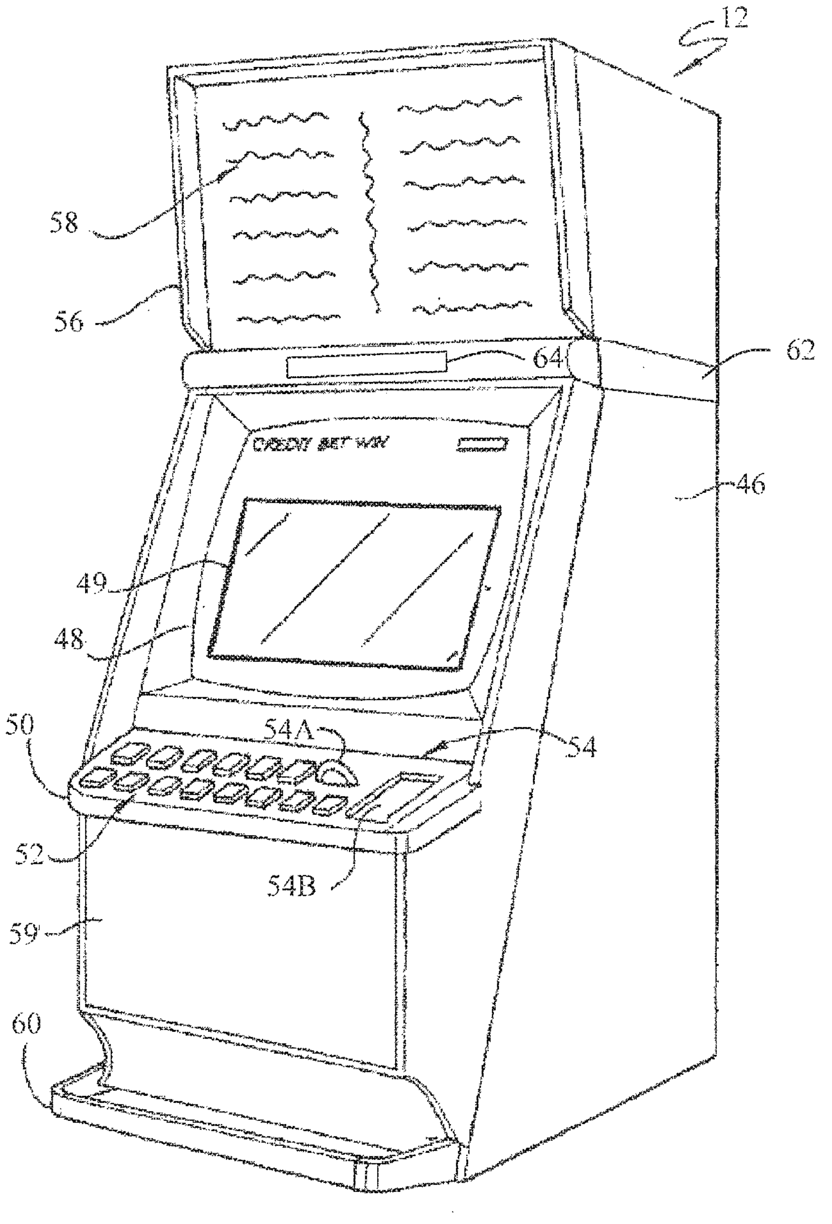
FIG. 2 is a diagrammatic representation of a gaming machine of the gaming system shown in FIG. 1.

An example gaming machine 12 is illustrated in FIG. 2. The gaming machine 12 includes a console 46 having a display 48 on which is displayed representations of a game 49 that can be played by a player. A mid-trim 50 of the gaming machine 12 houses a bank of buttons 52 for enabling a player to interact with the gaming machine, in particular during game play. The mid-trim 50 also houses a credit input mechanism 54 which in this example includes a coin input chute 54A and a bill collector 54B. Other credit input mechanisms may also be employed, for example, a card reader for reading a smart card, debit card or credit card.

A top box 56 may carry artwork 58, including for example pay tables and details of bonus awards and other information or images relating to the game. Further artwork and/or information may be provided on a front panel 59 of the console 42. A coin tray 60 is mounted beneath the front panel 59 for dispensing cash payouts from the gaming machine 30.

The display 49 is in the form of a video display unit, particularly a cathode ray tube screen device. Alternatively, the display 49 may be a liquid crystal display, plasma screen, or any other suitable video display unit. The top box 56 may also include a display, for example a video display unit, which may be of the same type as the display 49, or of a different type.

In the example, the display 49 is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols, and if a function has been allocated to a reel, on the basis of the allocated function.

A player marketing module (PMM) 62 having a display 64 is connected to the gaming machine 10. The main purpose of the PMM 62 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device.

Figure 3:
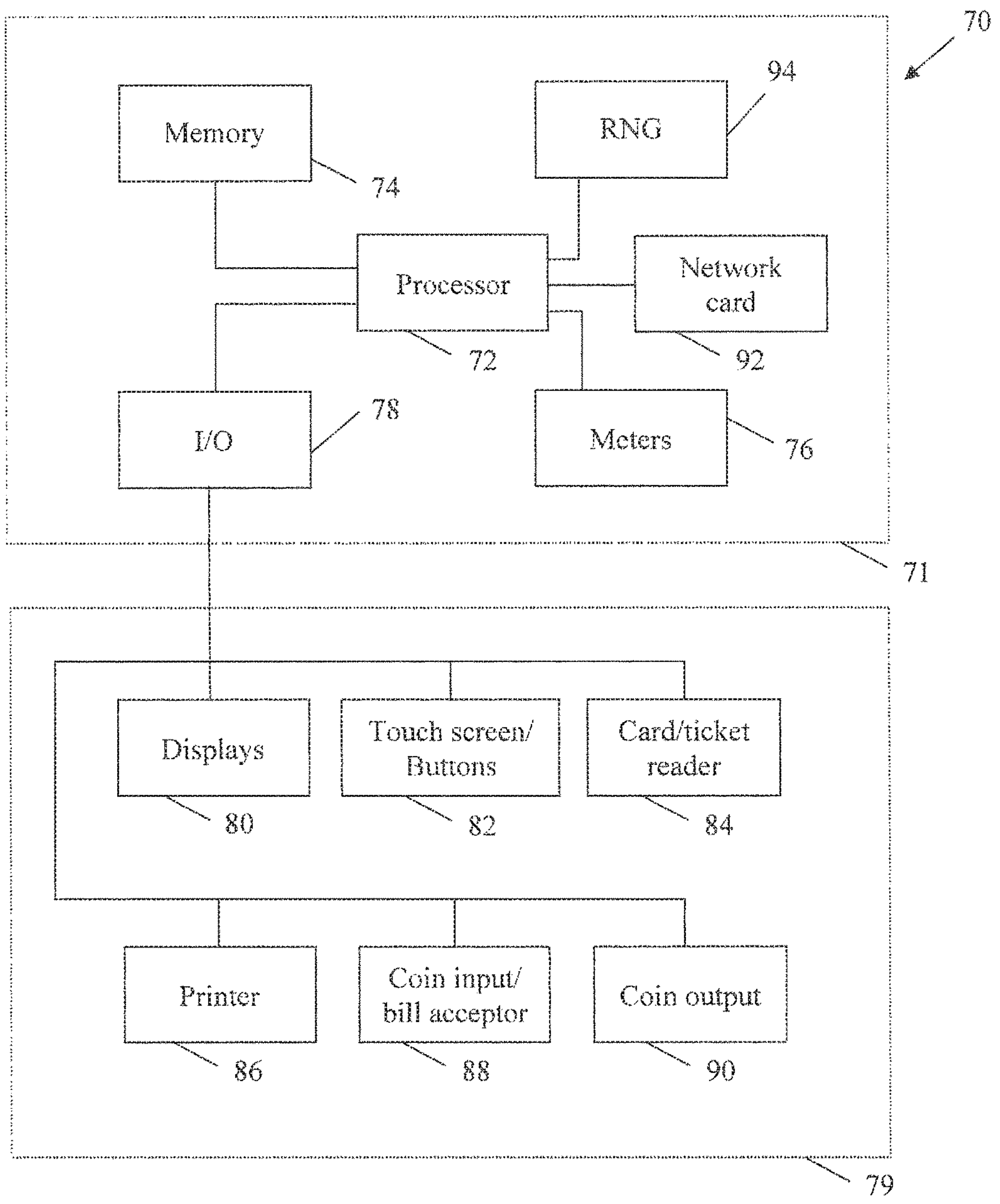
FIG. 3 is a schematic block diagram of operative components of the gaming machine shown in FIG. 2.

FIG. 3 shows a block diagram of operative components 70 of the gaming machine 12 shown in FIG. 2.

The operative components 70 include a game controller 71 having a processor 72. Instructions and data to control operation of the processor 72 in accordance with the present invention are stored in a memory 74 which is in data communication with the processor 72.

Typically, the operative components 70 will include both volatile and non-volatile memory and more than one of each type of memory, with such memories being collectively represented by the memory 74.

Figure 4:
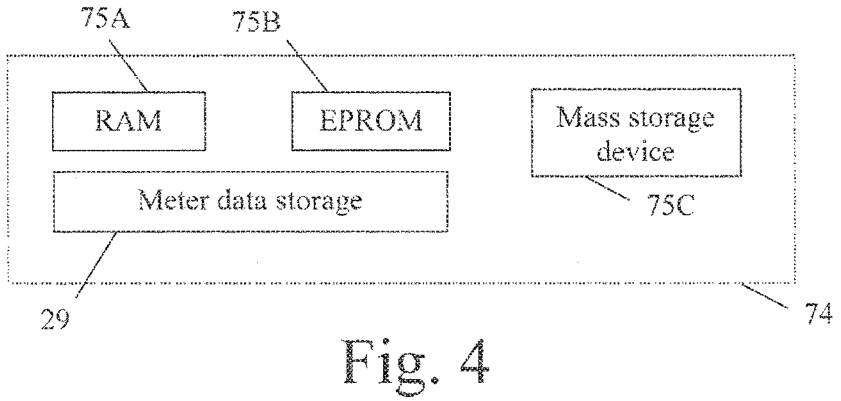
FIG. 4 is a schematic block diagram of components of a memory of the gaming machine shown in FIG. 2.

FIG. 4 shows a block diagram of the main components of an exemplary memory 74. The memory 74 includes RAM 75A, EPROM 75B and a mass storage device 75C. The RAM 75A typically temporarily holds program files for execution by the processor 72 and related data. The EPROM 75B may be a boot ROM device and/or may contain some system or game related code. The mass storage device 75C is typically used to store game programs, the integrity of which may be verified and/or authenticated by the processor 72 using protected code from the EPROM 75B or elsewhere. In this embodiment, the memory 74 also includes a local meter data storage device 29 which stores meter data as the meter data is created.

The gaming machine 12 also comprises hardware meters 76 for creating meter data including accounting data and game play data, an input/output (I/O) interface 78 for communicating with a player interface 79 of the gaming machine 12, the player interface 79 having several peripheral devices. The input/output interface 78 and/or the peripheral devices may be intelligent devices with their own memory for storing associated instructions and data for use with the input/output interface or the peripheral devices. A random number generator module 94 generates random numbers for use by the processor 72.

In the example shown in FIG. 3, the peripheral devices that communicate with the game controller 71 comprise one or more displays 80, a touch screen and/or bank of buttons 82, a card and/or ticket reader 84, a printer 86, a bill acceptor and/or coin input mechanism 88 and a coin output mechanism 90. Additional hardware may be included as part of the gaming machine 12, or hardware may be omitted as required for the specific implementation.

In addition, the operative components 70 include a communications interface, for example a network card 92 which enables the gaming machine 12 to communicate with the gaming network 14.

Operation of the gaming system 10 will now be described in relation to flow diagram 100 shown in FIG. 5 which illustrates an example method of handling meter data using the gaming system 10.

Referring to steps 102 to 118 of the flow diagram 100, during use prior to playing a game on a gaming machine 12, a meter record 28 is first created for the gaming machine 12 and stored on the meter database 26, each meter record 28 including several game records 30 associated with downloadable games implementable by the gaming machine 12.

After selection of a game to be implemented by the gaming machine 12, for example by a player, game data corresponding to the selected game(s) is downloaded from the game repository 18 to the gaming machine 12 by the download server 16 and the gaming machine 12 implements the game.

In this embodiment, the gaming machine 12 includes a local meter data storage device and meter data including accounting data and game play data is stored on the local meter data storage device as the meter data is created.

When the gaming machine 12 receives instructions, for example from a player, to change the game implemented by the gaming machine 12, the gaming machine 12 sends the locally stored meter data to the remote meter database 26 and the meter data is stored in the relevant game record 30 in the meter record 28 associated with the gaming machine 12. The local meter data storage device is then cleared and a fresh game is downloaded from the game repository 18.

When the gaming machine 12 receives a request from an accounting system 42 to provide meter data relating to one or more games, the gaming machine 12 sends a request to the database server 24 to retrieve meter data associated with the gaming machine 12 and relating to the relevant game(s) and the database server 24 supplies the requested meter data to the gaming machine 12. The gaming machine 12 then passes the retrieved meter data to the accounting system 42.

Figure 6:
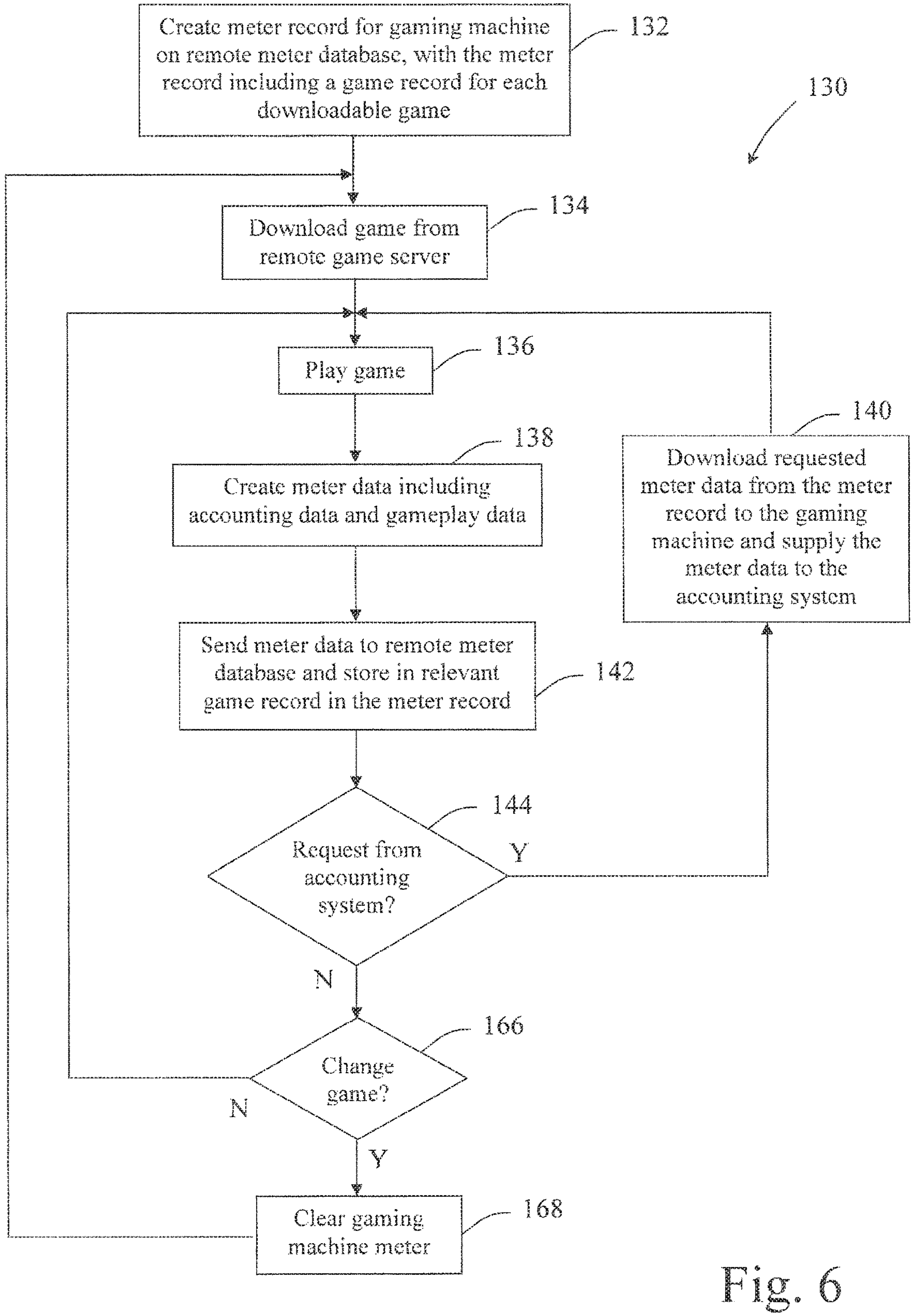
FIG. 6 is a flow diagram illustrating a method of handling meter data in accordance with an alternative embodiment of the present invention.

An alternative arrangement is illustrated by flow diagram 130 in FIG. 6.

Figure 5:
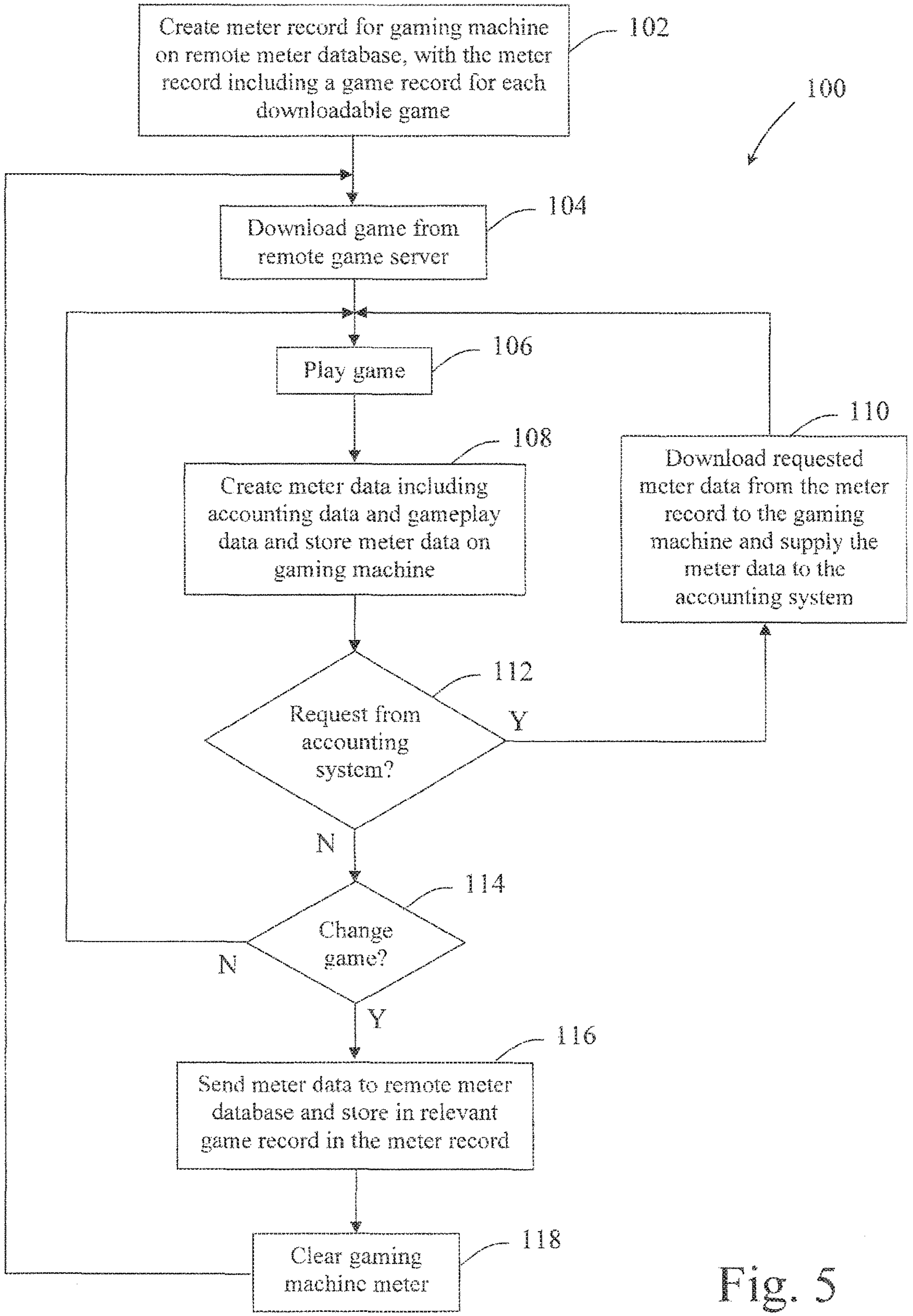
FIG. 5 is a flow diagram illustrating a method of handling meter data in accordance with an embodiment of the present invention.

With reference to steps 132 to 148, operation of this arrangement is similar to the example shown in FIG. 5. However, with this example meter data is not stored locally at the gaming machine 12, and instead is forwarded to the remote database server 24 as the meter data is created.

In a further alternative arrangement, the gaming machine may be provided with a local meter data storage device, but instead of forwarding meter data to the database server 24 only when a decision is made to change a game, meter data may be stored in the local meter data storage device and periodically forwarded to the database server 24, for example at predetermined intervals such as every five minutes.

While the meter data can be stored locally at the gaming machine 12, the redundant acceptance and storage of such data at the database 26 provides several advantages. It provides a back-up to the critical meter data for a casino and/or enterprise. Should a memory become corrupted or there is a casualty loss such as a fire, the meter data is retained. Second, for an enterprise with multiple casino locations, the combined meter data across the enterprise can be backed-up and data mined. As but an example, the enterprise may wish to look at the data for a game across the enterprise to determine whether it is profitable or in line with the profit expectations of the enterprise.

Another feature is that the database 26 can be remotely examined and interrogated by third party clients such as government regulators or games providers to confirm revenue reporting by the enterprise, confirm third party game license rates or provide the games providers with information regarding the performance of the games.

Modifications and variations as would be apparent to a skilled addressee are deemed to be within the scope of the present invention.

The invention claimed is:

1. A gaming system comprising:

a plurality of gaming machines, each operable to play a first downloadable game and a second downloadable game, each gaming machine having a credit input mechanism configured to receive a physical item associated with a monetary value for establishing a credit balance, the credit balance being increasable and decreasable based at least on wagering activity, and a game meter operable to generate meter data associated with play of the first downloadable game or the second downloadable game;

a remote data storage device having a meter database configured to store meter data associated with a plurality of games in the form of game records, each game record respectively associated with one of the gaming machines; wherein each game record includes a first meter record and a second meter record respectively associated with the first downloadable game and the second downloadable game playable by the one gaming machine;

wherein each gaming machine includes an interface configured to, in accord with the established credit balance, receive from a player a selection of one of the first downloadable game and the second downloadable game for play on the one gaming machine; and a communications link configured to facilitate transfer of meter data between the one gaming machine and the remote data storage device;

an accounting system configured to send a request to the one gaming machine via the communications link;

wherein, when the first downloadable game is selected for play on the one gaming machine by the player through the interface, the first downloadable game is downloaded onto the one gaming machine, the game meter generates meter data in accord with the play of the first downloadable game at the one gaming machine and updates the first meter record at the remote data storage device with the meter data;

wherein, while the first downloadable game is being played, and in response to receiving the request from the accounting system, the remote data storage device is further configured to transmit the updated first meter record associated with the one gaming machine to the accounting system over the communications link; and wherein, when the second downloadable game is selected for play on the one gaming machine by the player through the interface, the one gaming machine clears the game meter and downloads the second downloadable game onto the one gaming machine for play at the one gaming machine.

2. The gaming system as claimed in claim 1, further comprising a game repository including game data associated with a plurality of games including the first downloadable game and the second downloadable game, the game data being selectively downloadable and implementable as a game by the one gaming machine.

3. The gaming system as claimed in claim 1, further comprising a download server configured to download game data associated with a game from the game repository to a gaming machine when requested by the gaming machine.

4. The gaming system as claimed in claim 1, wherein the meter record is associated with a gaming machine and each meter record including information indicative of meter data associated with the or each game downloaded and implemented by the gaming machine.

5. The gaming system as claimed in claim 1, wherein the gaming system is configured to facilitate access to the meter data stored in the remote data storage device by a user.

6. A method of managing meter data for use with a gaming system having 1) a plurality of gaming machines, each gaming machine configured to play a first downloadable game and a second downloadable game, each gaming machine having an interface and a credit input mechanism configured to receive a physical item associated with a monetary value for establishing a credit balance, the credit balance being increasable and decreasable based at least on wagering activity, and a game meter operable to generate meter data associated with play of the first downloadable game or the second downloadable game, 2) a remote data storage device having a meter database, 3) an accounting system, and 4) a communications network configured to facilitate transfer of meter data between the plurality of gaming machines and the remote data storage device, the method comprising:

storing meter data associated with a plurality of games in the form of game records, each game record respectively associated with one of the gaming machines; wherein each game record includes a first meter record and a second meter record respectively associated with the first downloadable game and the second downloadable game playable by the one gaming machine;

receiving through the interface from a player a selection of one of the first downloadable game and the second downloadable game for play on the one gaming machine;

downloading the first downloadable game, when the first downloadable game is selected for play on the one gaming machine by the player through the interface;

generating, at the game meter, meter data in accord with the play of the first downloadable game at the one gaming machine;

forwarding meter data generated at the one gaming machine through the communications network to to update the first meter record at the remote data storage device;

sending from the accounting system a request to the one gaming machine via the communications network while the first downloadable game is being played;

in response to receiving the request from the accounting system, transmitting the updated first meter record associated with the one gaming machine from the remote data storage device to the accounting system via the communications network;

in response to the second downloadable game having been selected for play on the one gaming machine by the player through the interface, the one gaming machine clearing the game meter, and downloading the second downloadable game onto the one gaming machine for play at the one gaming machine.

7. The method as claimed in claim 6, wherein the gaming system further comprises game repository including game data associated with a plurality of games including the first downloadable game and the second downloadable game through the communications network.

8. The method as claimed in claim 7, further comprising forwarding the meter data to the remote data storage device periodically.

9. The method as claimed in claim 7, further comprising receiving the first downloadable game from a remote location.

10. The method as claimed in claim 6, comprising generating meter data including at least on of accounting data indicative of credits received in the first downloadable game, credits dispensed by the first downloadable game and credits available for game play.

11. The method as claimed in claim 6, wherein generating meter data including generating game play data indicative of game actions and outcomes for at least one previously played game.

12. A gaming machine operable to play at least one a first downloadable game and a second downloadable game, and communicate with a remote data storage device configured to store meter data associated with a plurality of games in the form of game records, each game record being associated with the gaming machine, wherein each game record includes a first meter record and a second meter record respectively associated with the first downloadable game and the second downloadable game playable by the gaming machine, the gaming machine comprising:

a credit input mechanism configured to receive a physical item associated with a monetary value for establishing a credit balance, the credit balance being increasable and decreasable based at least on wagering activity;

an interface configured to, in accord with having established the credit balance via the credit input mechanism receiving the physical item, receive from a player a selection of one of the first downloadable game and the second downloadable game for play on the gaming machine;

a game meter configured to generate meter data in connection of play of the first downloadable game or the second downloadable game on the gaming machine; and a game controller configured to forward meter data generated by the game meter to the remote data storage device; and wherein, when the first downloadable game is selected for play through the interface, the first downloadable game is downloaded onto the gaming machine, the game meter generates meter data in accord with the play of the first downloadable game at the gaming machine and updates the first meter record at the remote data storage device with the meter data;

wherein, while the first downloadable game is being played, and in response to receiving the request from the accounting system, the remote data storage device is further configured to transmit the updated first meter record to the accounting system;

wherein, when the second downloadable game is selected for play through the interface, the one gaming machine clears the game meter and downloads the second downloadable game onto the gaming machine for play.

* * * * *